(12) United States Patent
Lanham et al.

(10) Patent No.: US 12,111,195 B2
(45) Date of Patent: Oct. 8, 2024

(54) CORIOLIS FLOW METER WITH FLOW TUBE INCLUDING INSERTS

(71) Applicant: MICRO MOTION, INC., Boulder, CO (US)

(72) Inventors: Gregory Treat Lanham, Longmont, CO (US); Christopher A. Werbach, Loveland, CO (US)

(73) Assignee: MICRO MOTION, INC., Boulder, CO (US)

( * ) Notice: Subject to any disclaimer, the term of this patent is extended or adjusted under 35 U.S.C. 154(b) by 0 days.

(21) Appl. No.: 17/772,274

(22) PCT Filed: Nov. 6, 2019

(86) PCT No.: PCT/US2019/060038
§ 371 (c)(1),
(2) Date: Apr. 27, 2022

(87) PCT Pub. No.: WO2021/091551
PCT Pub. Date: May 14, 2021

(65) Prior Publication Data
US 2022/0381599 A1    Dec. 1, 2022

(51) Int. Cl.
*G01F 1/84*    (2006.01)
(52) U.S. Cl.
CPC .......... *G01F 1/8468* (2013.01); *G01F 1/8404* (2013.01); *G01F 1/8422* (2013.01); *G01F 1/8427* (2013.01)

(58) Field of Classification Search
CPC .... G01F 1/8404; G01F 1/8409; G01F 1/8422; G01F 1/8427; G01F 1/8468; G01F 1/8472
See application file for complete search history.

(56) References Cited

U.S. PATENT DOCUMENTS

| | | | |
|---|---|---|---|
| 3,965,730 A | 6/1976 | Innes | |
| 4,275,602 A * | 6/1981 | Fujishiro | G01F 1/3209 73/861.22 |
| 6,041,665 A | 3/2000 | Hussain | |
| 6,058,787 A * | 5/2000 | Hughes | G01F 1/74 73/861.66 |
| 6,240,775 B1 * | 6/2001 | Uramachi | G01F 1/6842 73/114.34 |

(Continued)

FOREIGN PATENT DOCUMENTS

| | | |
|---|---|---|
| EP | 0831303 B1 | 4/2008 |
| JP | H05248910 A | 9/1993 |

(Continued)

*Primary Examiner* — Erika J. Villaluna
(74) *Attorney, Agent, or Firm* — The Ollila Law Group LLC

(57) ABSTRACT

A Coriolis flow meter (100) comprises a driver (180) coupled to a flow tube (800,900), the driver (180) configured to oscillate the flow tube in a drive direction, a pick-off sensor (170L, 170R) coupled to the flow tube (800,900), configured to measure a movement of the flow tube (800, 900), and the flow tube (800,900) comprises a conduit (852) having an interior surface (854), and a plurality of inserts (856a, 856b, 856c, 856d, 956a, 956b), each respective insert of the plurality of inserts (856a, 856b, 856c, 856d, 956a, 956b) being coupled to at least a first position (858) on the interior surface (854) of the conduit (852).

14 Claims, 11 Drawing Sheets

(56) References Cited

U.S. PATENT DOCUMENTS

| | | | |
|---|---|---|---|
| 8,826,745 B2 * | 9/2014 | Van Cleve | G01F 15/024 73/861.357 |
| 9,080,908 B2 * | 7/2015 | Yoder | G01F 1/90 |
| 2013/0181565 A1 | 7/2013 | Petro et al. | |

FOREIGN PATENT DOCUMENTS

| | | |
|---|---|---|
| JP | H10221146 A | 8/1998 |
| WO | 2019040055 A1 | 2/2019 |

* cited by examiner

CORIOLIS FLOW METER WITH FLOW TUBE INCLUDING INSERTS

TECHNICAL FIELD

The embodiments described below relate to Coriolis flow meters, and more particularly, to Coriolis flow meters with flow tubes including inserts.

BACKGROUND

Coriolis flow meters are one type of flow meter that may be used to measure the mass flow rate, density, volume flow rate, and provide other information for flowing materials. The flowing materials can include liquids, gases, combined liquids and gases, solids suspended in liquids, and liquids including gases and suspended solids.

FIG. 1 depicts example Coriolis flow meter 100 comprising a meter assembly 10 and meter electronics 20. Meter assembly 10 responds to changes in a process material flow. Meter electronics 20 may be connected to meter assembly 10 via leads 102, or wirelessly, to provide density, volumetric flow rate, and mass flow rate information over meter electronics interface 26, in addition to other information.

In the example, Coriolis flow meter 100 comprises two bent flow tubes 130 and 130'. In further embodiments, however, Coriolis flow meter 100 may include a single flow tube, or more than two flow tubes. Alternatively, Coriolis flow meter 100 may comprise one or more curved or straight flow tubes, as will be understood by those of skill.

Example meter assembly 10 includes a pair of manifolds 150 and 150', flanges 103 and 103', a pair of parallel flow tubes 130 and 130', driver 180, and a pair of pick-off sensors 170L and 170R. Flow tubes 130 and 130' bend at two symmetrical locations along their length and are essentially parallel throughout their length. Brace bars 140 and 140' serve to define an axis about which each flow tube oscillates.

When flanges 103 and 103' are connected via inlet end 104 and exit end 104' into a process line (not shown), which carries the process material that is being measured, material enters inlet end 104 of the meter through flange 103 and is conducted through manifold 150 to flow tube mounting block 120. Within manifold 150 the material is divided and routed through flow tubes 130 and 130'. Upon exiting flow tubes 130 and 130', the process material is recombined in a single stream within manifold 150' through flow tube mounting block 120' and is thereafter routed to exit end 104' connected by flange 103' to the process line (not shown).

Both flow tubes 130 and 130' are driven by driver 180 in opposite directions and at what is termed the first out-of-phase bending mode of the Coriolis flow meter 100. This driver 180 may comprise any one of many well-known arrangements, such as a magnet mounted to flow tube 130' and an opposing coil mounted to flow tube 130, through which an alternating current is passed to vibrate both flow tubes. A suitable driver voltage is applied by meter electronics 20 to driver 180.

Meter electronics 20 provides the drive signal to driver 180 to vibrate flow tubes 130 and 130'. Meter electronics 20 receives the left and right velocity signals from pick-off sensors 170L and 170R to compute the mass flow rate, volumetric rate, and/or density information for the flow passing through meter assembly 10.

Pick-off sensors 170L and 170R measure the displacement of flow tubes 130 and 130' as they vibrate. With no flow through flow tubes 130 and 130', pick-off sensor 170L and 170R signals are in phase. Once flow begins through the vibrating tubes, however, a Coriolis force is induced on the tubes.

The fluid that flows through Coriolis flow meters can exhibit laminar flow. A fluid under laminar flow in a conduit will have a lower velocity adjacent to the boundaries of the conduit and a higher velocity away from those boundaries. For this reason, prior Coriolis flow meters can generate smaller mass Coriolis forces and correspondingly smaller mass flow measurements. Due to laminar flow, prior Coriolis flow meters can thereby undermeasure fluid flow.

What is needed is a Coriolis flow meter with improved measurement accuracy under laminar flow conditions.

SUMMARY

According to an embodiment, a Coriolis flow meter is provided. The Coriolis flow meter comprises a driver coupled to a flow tube, the driver configured to oscillate the flow tube in a drive direction, a pick-off sensor coupled to the flow tube, configured to measure a movement of the flow tube, and the flow tube comprising a conduit having an interior surface, and a plurality of inserts, each respective insert of the plurality of inserts being coupled to at least a first position on the interior surface of the conduit.

According to an embodiment, a method of assembling a Coriolis flow meter is provided. The method comprises providing a flow tube, coupling a driver to the flow tube, the driver configured to oscillate the flow tube in a drive direction, and coupling a pick-off sensor coupled to the flow tube, the pick-off sensor configured to measure a movement of the flow tube, wherein the flow tube comprises a conduit having an interior surface, and a plurality of inserts, each respective insert of the plurality of inserts being coupled to at least a first position on the interior surface of the conduit.

Aspects

According to an aspect, the plurality of inserts may be shaped as rods.

According to an aspect, the plurality of inserts may be shaped as fins.

According to an aspect, the first position of at least one of the plurality of inserts may be within an active portion of the conduit.

According to an aspect, the first position on the interior surface of the conduit may be within a bend of the conduit.

According to an aspect, each respective insert of the plurality of inserts may extend across at least 25 percent of a diameter of the conduit.

According to an aspect, each respective insert of the plurality of inserts may include a first end coupled to the first position and a second end that is coupled to at least a second position on the interior surface of the conduit.

According to an aspect, a diameter of the conduit may be at least 2 inches.

According to an aspect, the plurality of inserts may include a first insert having a first longitudinal extent and a second insert having a second longitudinal extent, the first longitudinal extent being offset 45 degrees or more from the second longitudinal extent.

According to an aspect, the plurality of inserts may be shaped as rods.

According to an aspect, the plurality of inserts may be shaped as fins.

According to an aspect, the first position on the interior surface of the conduit may be within an active portion of the conduit.

According to an aspect, the first position on the interior surface of the conduit may be within a bend of the conduit.

According to an aspect, each respective insert of the plurality of inserts may extend across at least 25 percent of a diameter of the conduit.

According to an aspect, each respective insert of the plurality of inserts may include a first end coupled to the first position and a second end that is coupled to at least a second position on the interior surface of the conduit.

According to an aspect, a diameter of the conduit may be at least 2 inches.

According to an aspect, the plurality of inserts may include a first insert having a first longitudinal extent and a second insert having a second longitudinal extent, the first longitudinal extent being offset 45 degrees or more from the second longitudinal extent.

BRIEF DESCRIPTION OF THE DRAWINGS

The same reference number represents the same element on all drawings. It should be understood that the drawings are not necessarily to scale.

DETAILED DESCRIPTION

FIGS. 2-10 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below may be combined in various ways to form multiple variations of the Application. As a result, the Application is not limited to the specific examples described below, but only by the claims and their equivalents.

Figure 1:
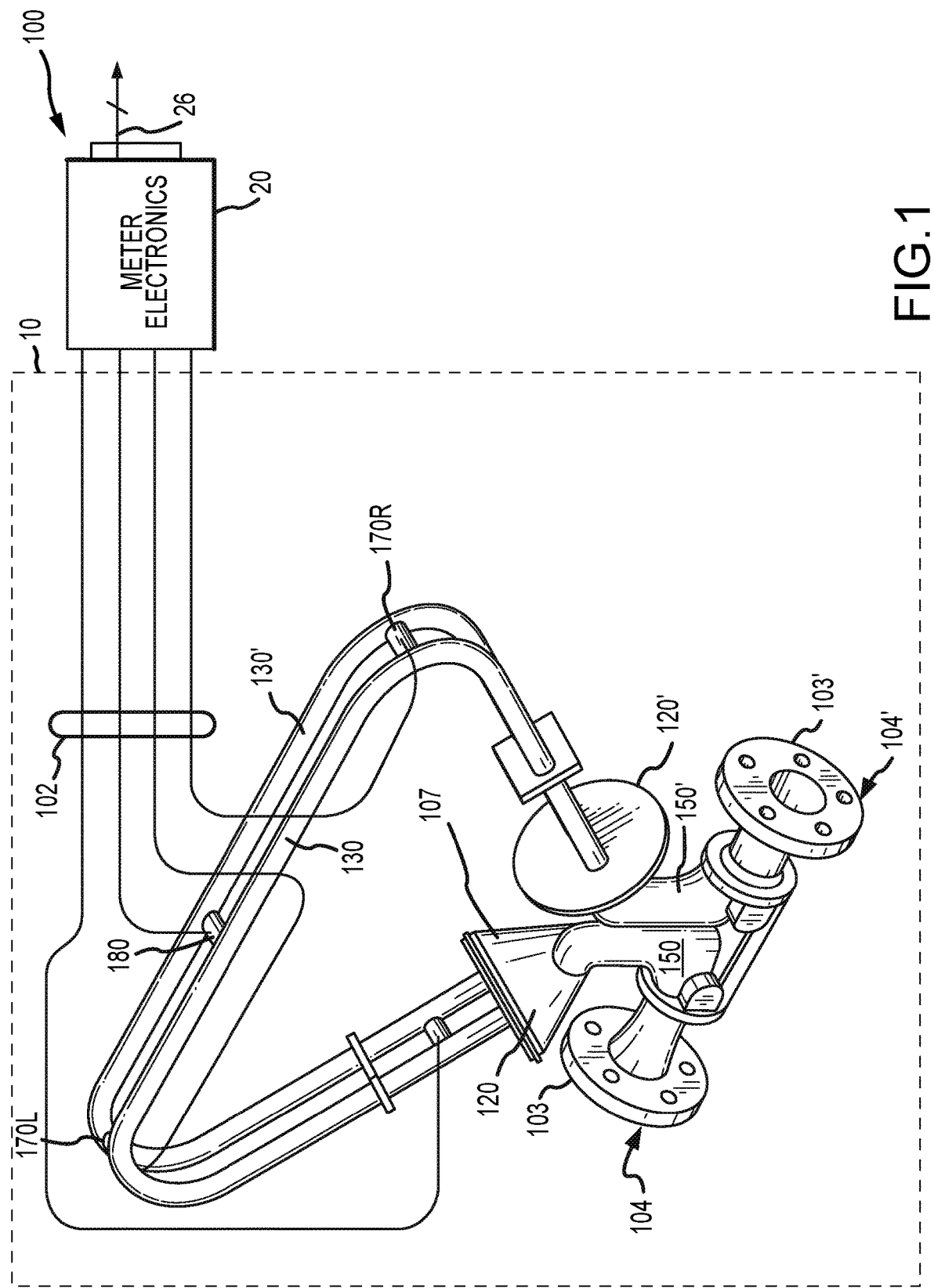
FIG. 1 depicts a flow meter 100, in accordance with an embodiment.
Figure 2:
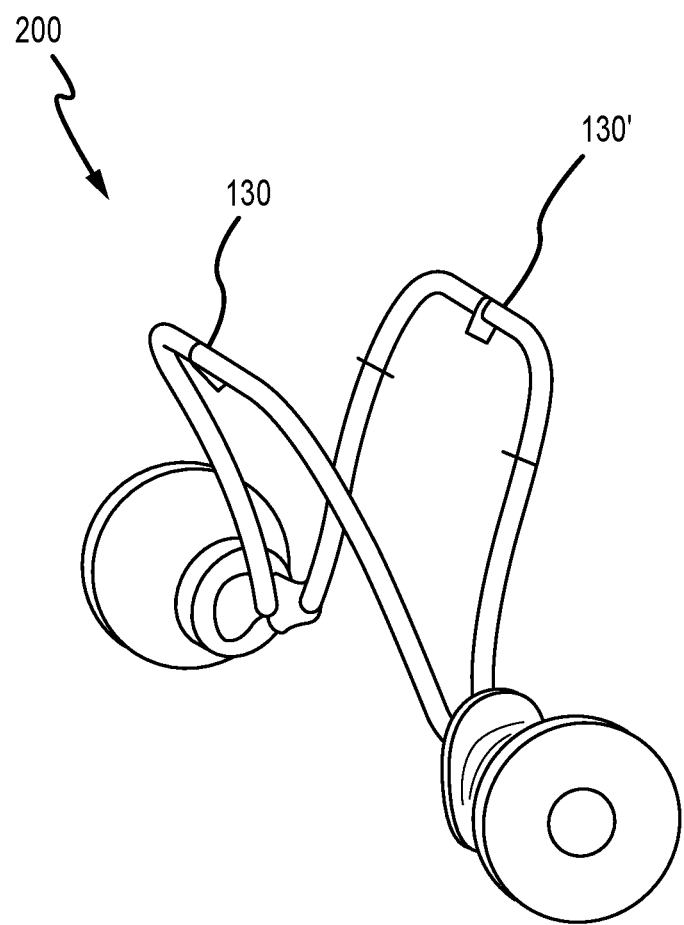
FIG. 2 depicts moving flow tubes 200, in accordance with an embodiment.

FIG. 2 depicts moving flow tubes 200. Moving flow tubes 200, which comprise flow tubes 130, 130' of flow meter 100, oscillate in the first out-of-phase bend mode (drive mode) with no fluid flow in the Figure. As may be seen in FIG. 1, pick-off sensors 170R, 170L are coupled to flow tubes 130, 130' on either side of driver 180 to measure the displacement of flow tubes 130, 130' as they vibrate. Under no flow conditions, such as those depicted in FIG. 2, pick-off sensors 170R, 170L provide symmetric, in phase signals. After fluid flow begins through the vibrating tubes, however, a Coriolis force is induced on the tubes.

The equation for the Coriolis force is as follows:

$$\vec{F} = -2m\vec{\omega} \times \vec{V}, \quad \text{(Equation 1)}$$

where $\vec{F}$ is the Coriolis force, m is the mass, $\vec{\omega}$ is the angular rotation, and $\vec{V}$ is the velocity of the fluid. The Coriolis force with fluid flow in the out-of-phase bend mode may be seen in moving flow tube 300 of FIG. 3A. Two example force vector diagrams including angular momentum $\vec{\omega}$, the velocity $\vec{V}$, and the Coriolis force $\vec{F}$ are overlaid over moving flow tube 300 on FIG. 3A on either side of driver 180.

Figure 3A:
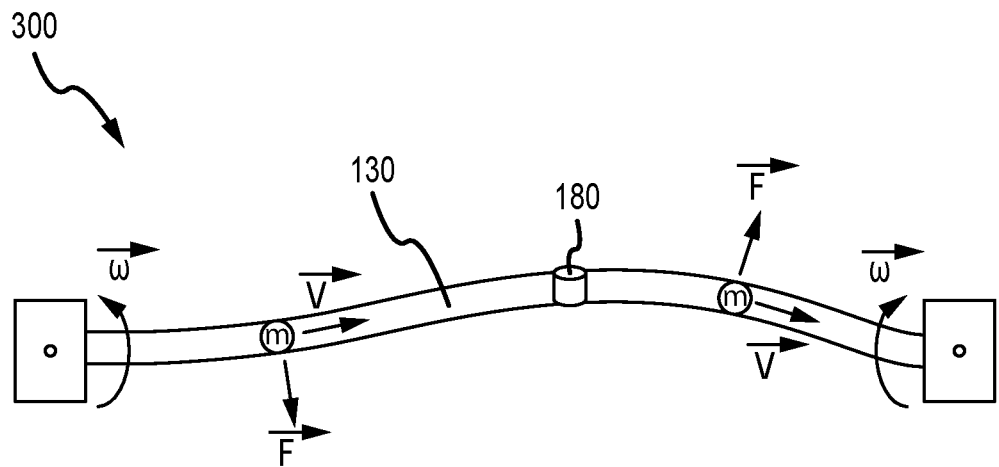
FIG. 3A depicts a moving flow tube 300, in accordance with an embodiment.
Figure 3B:
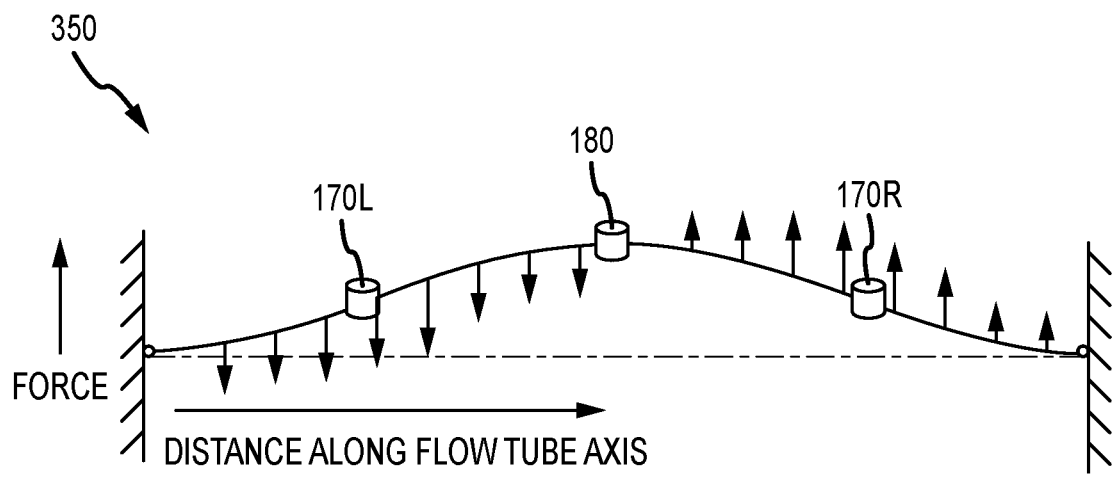
FIG. 3B depicts a plot 350, in accordance with an embodiment.

The Coriolis force distribution along moving flow tube 300 during the out-of-phase bend mode is depicted in plot 350 of FIG. 3B. In plot 350, the X-axis is the distance along the axis of flow tube 130 and the Y-axis is the Coriolis force. Overlaid on plot 350 are the example locations of pick-off sensors 170L, 170R and driver 180. It may be seen that the Coriolis force vector $\vec{F}$ points in opposite directions on either side of the driver.

Figure 4A:
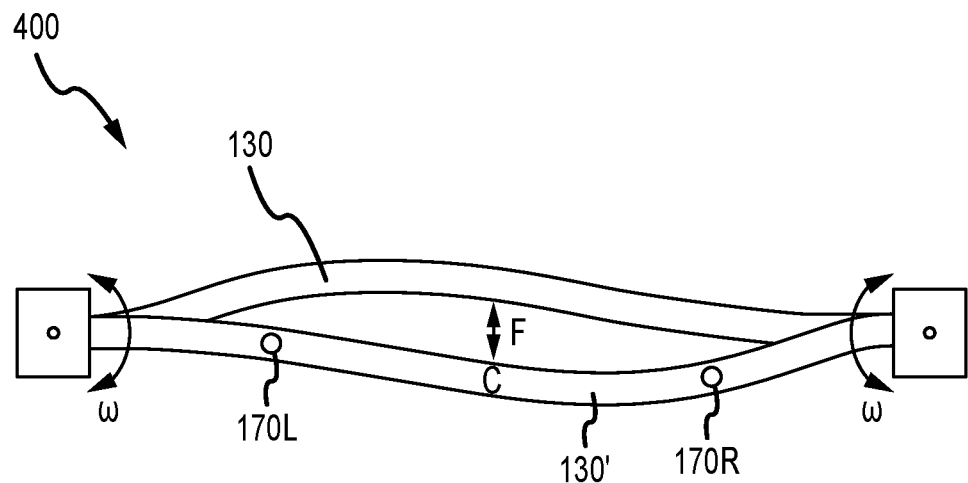
FIG. 4A depicts moving flow tubes 400, in accordance with an embodiment.
Figure 4B:
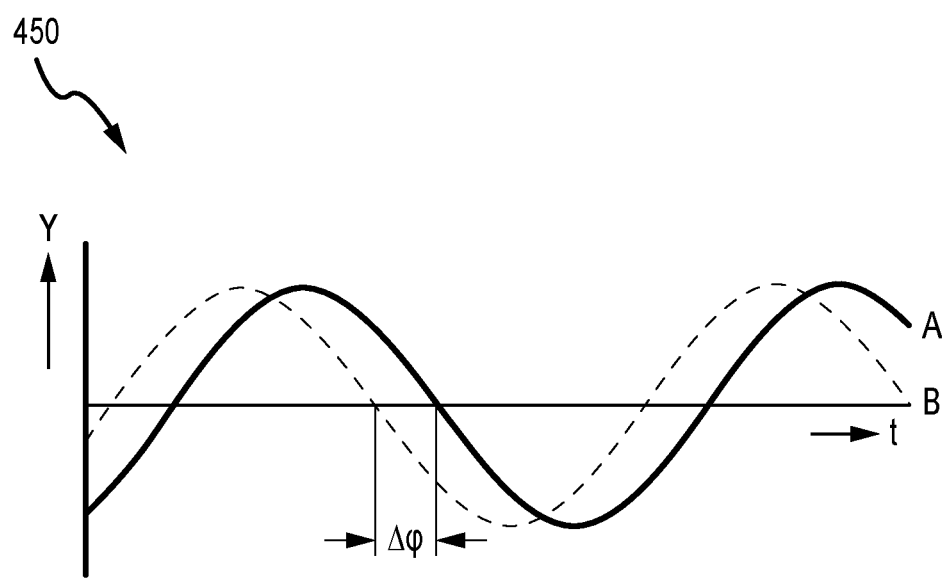
FIG. 4B depicts a plot 450, in accordance with an embodiment.

FIG. 4A depicts moving flow tubes 400. Moving flow tubes 400 comprise two flow tubes 130, 130' in out-of-phase bending mode with fluid flow. FIG. 4B depicts plot 450 comprising the phases detected at pick-off sensors 170L and 170R during fluid flow. As may be seen in plot 450, the phase difference between the motion detected at pick-off sensors 170L and 170R is phase offset Δφ. Phase offset Δφ is directly proportional to mass flow rate ṁ of the fluid under test:

$$\dot{m} \propto FCF \times \Delta\varphi, \quad \text{(Equation 2)}$$

and FCF (grams per second/microsecond) is the meter flow calibration factor. The flow calibration factor FCF is often determined by the manufacturer under test conditions.

Turbulent and laminar flow is determined by the Reynolds number $$Re = \frac{\rho VD}{\mu}, \quad \text{(Equation 3)}$$

where, ρ is density, V is velocity, D is diameter, and μ is viscosity. A fluid is approximately laminar when the Reynolds number Re is below 2000, and turbulent when it is above 4000. When the Reynolds number Re is between 2000 and 4000, the fluid is in a transition zone between turbulent and laminar.

Equation 1 assumes that the fluid velocity $\vec{V}$ term is uniform throughout the tube. However, the assumption of uniform fluid velocity $\vec{V}$ only applies to fluids in the turbulent flow regime. Fluids in the laminar flow regime have velocities that vary across the flow tube diameter.

Figure 5A:
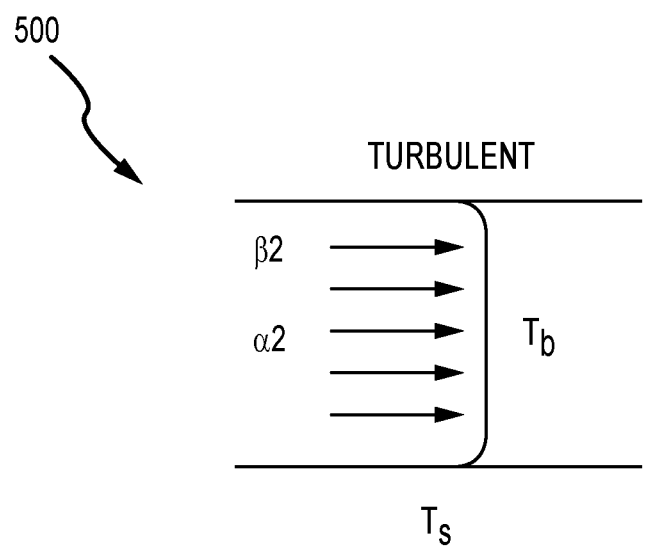
FIG. 5A depicts fluid flow 500, in accordance with an embodiment.
Figure 5B:
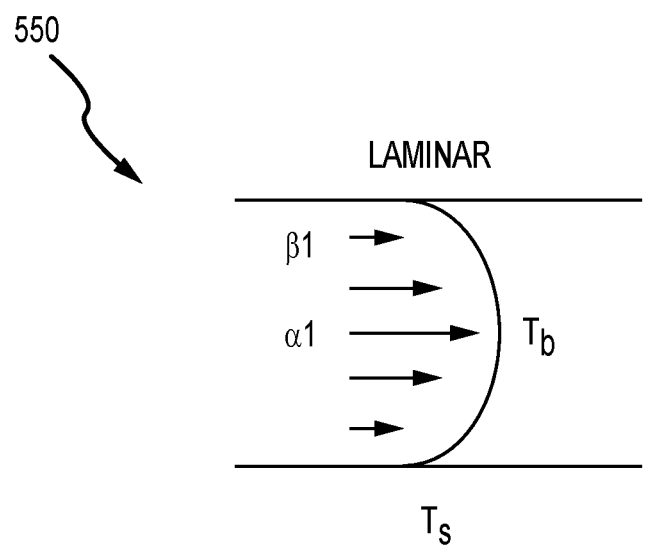
FIG. 5B depicts fluid flow 550, in accordance with an embodiment.

For example, FIGS. 5A and 5B depict fluid flow 500 and fluid flow 550 respectively. Fluid flows 500 and 550 depict velocity $\vec{V}$ profiles (length of horizontal arrows) across the diameter of flow tube 130 (oriented vertically) for turbulent and laminar fluid flows, respectively. The flows in FIGS. 5A and 5B represent fluids with the same mass m and angular rotation $\vec{\omega}$. As may be seen in FIGS. 5A and 5B, the velocity vectors α1 and α2 positioned along the central axes of the flow tube have the same magnitude under laminar flow and turbulent flow. Therefore, along the central axis of a flow tube, fluids under laminar and turbulent flows produce approximately the same effective Coriolis force $\vec{F}$.

Along the boundaries of fluid flows 500 and 550, however, velocity vector β1 is depicted for laminar flow, and velocity vector β2 is depicted for turbulent flow. For turbulent flow, velocity vectors β2 and α2 are approximately the same. However, for laminar flow, inner velocity vector α1 is greater than outer velocity vector β1. Because turbulent flow velocity vector β2 is greater than laminar flow vector β1, a fluid under laminar flow will therefore produce less effective Coriolis force $\vec{F}$ for a fluid under turbulent flow. Therefore, the mass flow ṁ determined for fluid flow 550, the fluid under laminar flow conditions, may be less than the mass flow ṁ determined for fluid flow 500, the fluid under turbulent flow conditions.

Figure 6:
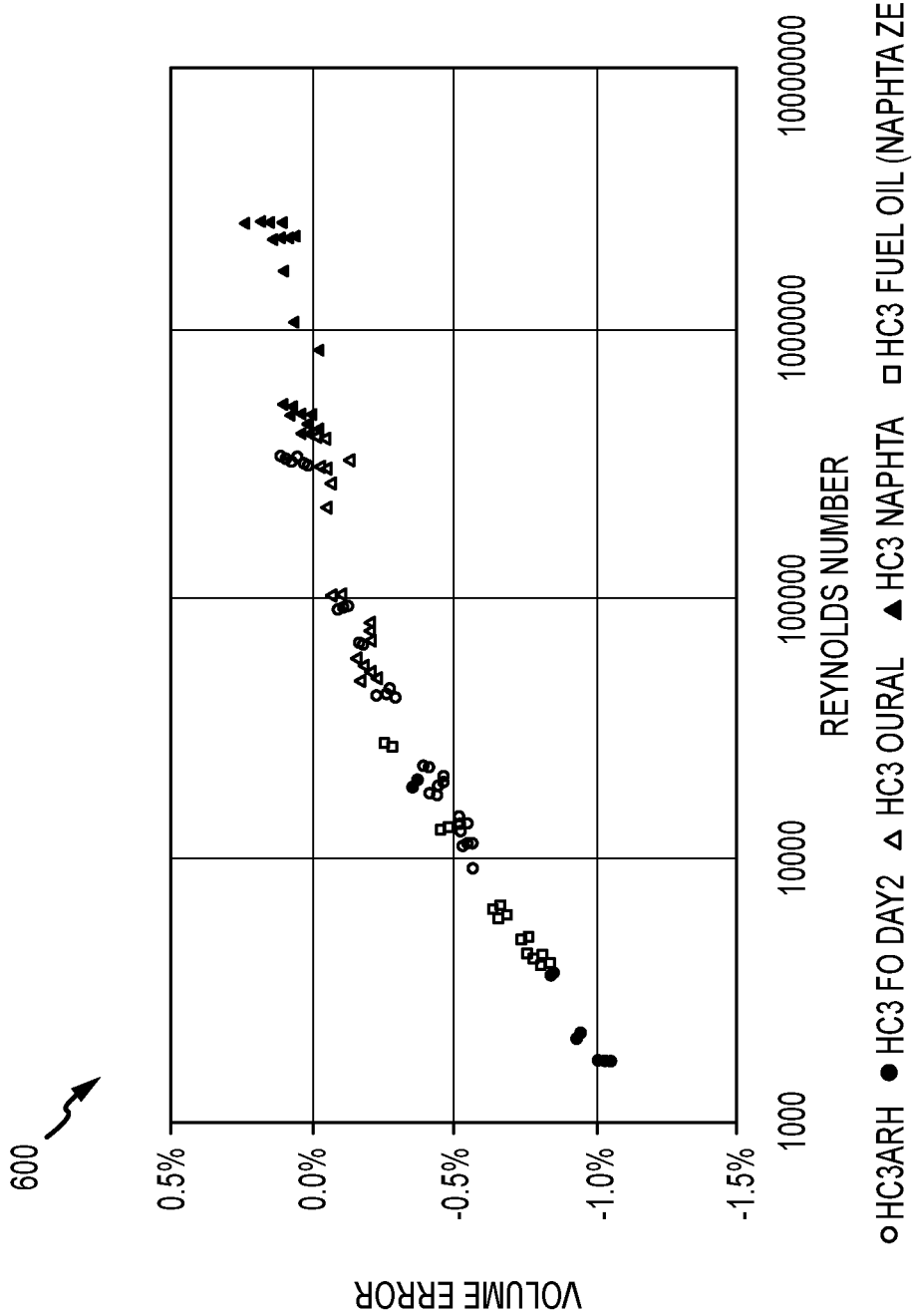
FIG. 6 depicts plot 600, in accordance with an embodiment.

FIG. 6 depicts plot 600, which demonstrates the low flow error effect. Plot 600 includes a Y-axis comprising a volume error percentage, and an X-axis comprising a Reynolds number. In plot 600, it may be seen that fluids with Reynolds numbers below 100,000 include an increasing amount of negative volume error, which may be attributed to undermeasurement due to laminar flow.

Figure 7A:
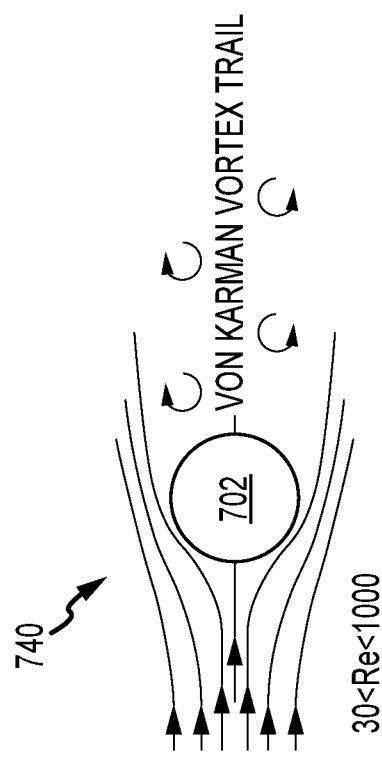
FIG. 7A depicts fluid flow 700, in accordance with an embodiment.
Figure 7C:
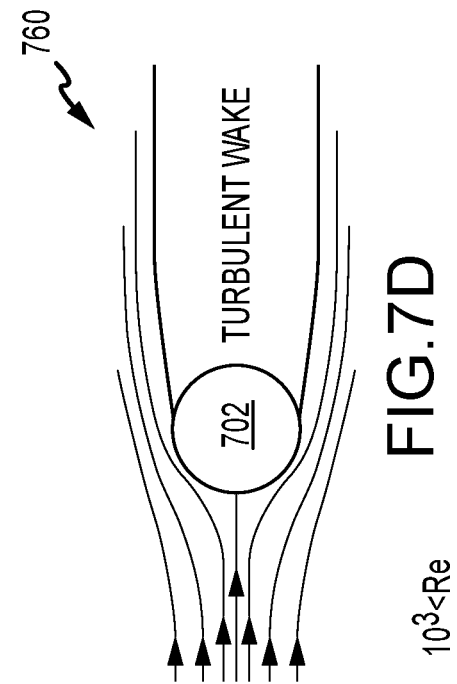
FIG. 7C depicts fluid flow 740, in accordance with an embodiment.
Figure 7B:
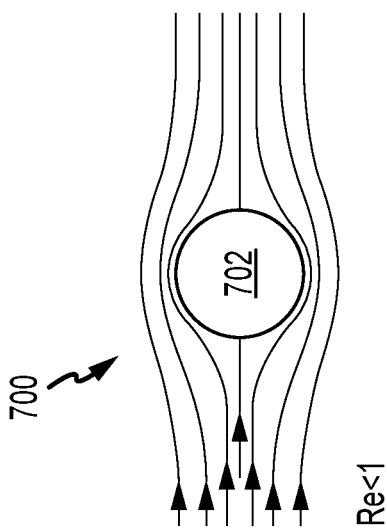
FIG. 7B depicts fluid flow 720, in accordance with an embodiment.
Figure 7D:
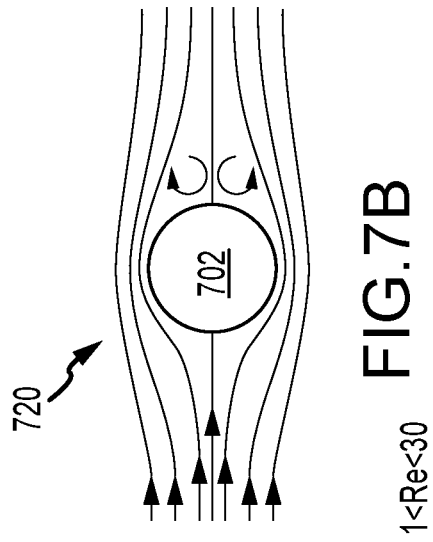
FIG. 7D depicts fluid flow 760, in accordance with an embodiment.

FIGS. 7A, 7B, 7C, and 7D depict fluid flows 720, 740, 760, and 780, respectively, around an obstacle 702. As may be seen, the fluid, which enters FIGS. 7A to 7D from the left in laminar flow, exits the Figures to the right after diverting around obstacle 702. In FIG. 7A, the fluid has a Reynolds number Re that is less than 1, and the fluid resumes laminar flow after passing obstacle 702. In FIG. 7B, the fluid has a Reynolds number Re that is between 1 and 30, which produces a little bit of vortex activity before resuming laminar flow after passing obstacle 702. In FIG. 7C, the fluid has a Reynolds number Re that is between 30 and 1000, and the fluid produces more vortexes to form a von Karman vortex trail after passing obstacle 702. In FIG. 7D, the fluid has a Reynolds number Re that is greater than 1000, and the fluid becomes turbulent for some distance along the flow tube after passing obstacle 702.

Figure 8A:
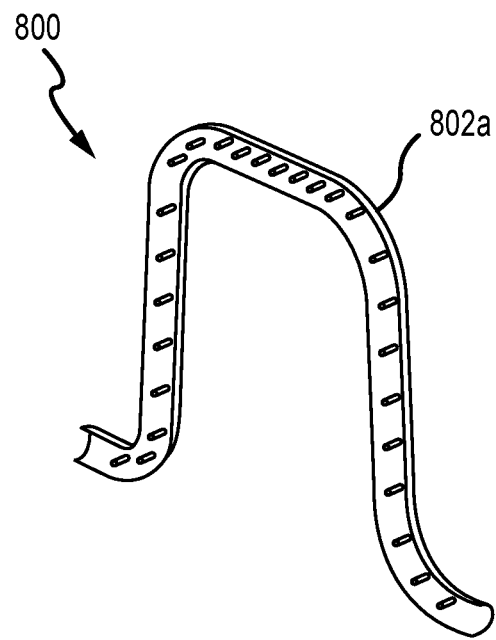
FIG. 8A depicts a flow tube 800, in accordance with an embodiment.
Figure 8B:
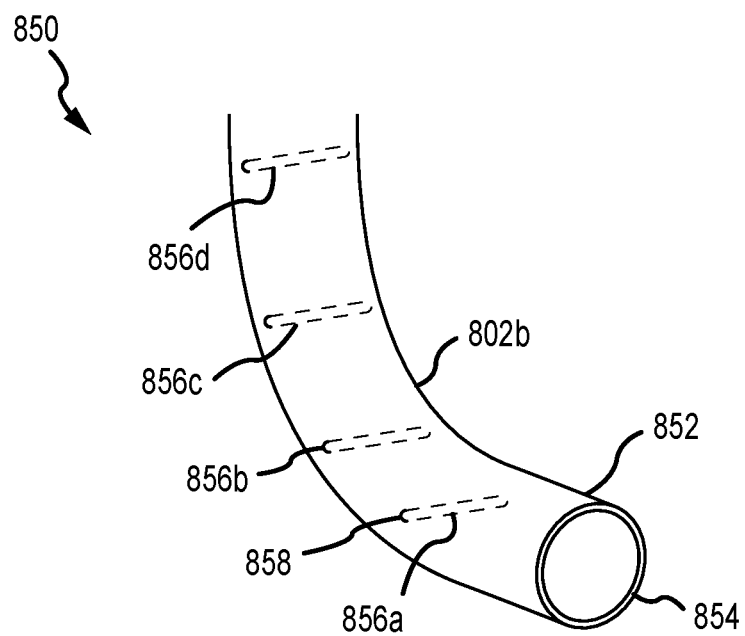
FIG. 8B depicts a detail 850 of flow tube 800, in accordance with an embodiment.

In an embodiment of the application, a flow tube with inserts is used to generate turbulence in the fluid to reduce the volume error for fluids with Reynolds numbers below 100,000, similar to obstacle 702 in FIG. 7D. For example, FIG. 8A depicts a cutaway view of flow tube 800, and FIG. 8B depicts a detail of a flow tube 800 for a Coriolis flow meter 100 in accordance with an embodiment. As described above, Coriolis flow meter 100 comprises a driver 180 coupled to a flow tube, for example flow tube 700, the driver 180 configured to oscillate the flow tube 800 in a drive direction. The Coriolis flow meter 100 further comprises a pick-off sensor 170L, 170R coupled to the flow tube 800, configured to measure a movement of the flow tube 800.

It should be appreciated that while the Coriolis flow meter 100 described above comprises a dual flow conduit flow meter, it is well within the scope of the present invention to implement a single, or any other multiple conduit flow meter. Furthermore, while the flow conduits 130, 130' are shown as comprising a curved flow conduit configuration, the present invention may be implemented with a flow meter comprising one or more straight flow conduits. Therefore, the particular embodiment of the Coriolis flow meter 100 described above is merely one example and should in no way limit the scope of the present invention.

Flow tube 800 includes a conduit 852 having an interior surface 854. In embodiments, the conduit 852 may have a circular cross section, an oval cross section, or any other cross section known to those of skill. In the example of flow tube 800, with the conduit 852 including a circular cross section, the interior surface 854 is a cylindrical surface with four bends.

Flow tube 800 further comprises a plurality of inserts, each respective insert of the plurality of inserts being coupled to at least a first position on the interior surface of the conduit. For example, FIG. 8B depicts plurality of inserts 856a, 856b, 856c, 856d, and FIG. 8A depicts further plurality of inserts along other sections of flow tube 800. Each respective insert of the plurality of inserts 856a, 856b, 856c, 856d is coupled to a respective position, for example first position 858 for insert 856a, on the interior surface 854 of the conduit 852.

By placing the plurality of inserts 856a, 856b, 856c, 856d along an interior surface 854 of the flow tube 800, it may be possible to provide turbulent flow within the Coriolis flow meter 100, thereby reducing the errors generated when a fluid under measurement exhibits laminar flow.

The example of flow tube 800 is not intended to be limiting. As those of skill in the art will readily understand, flow tube 800 may include any number of inserts 856a, 856b, 856c, 856d to increase turbulent flow.

In embodiments, the first position 858 of at least one of the plurality of inserts 856a, 856b, 856c, 856d may be positioned in an active portion of the flow tube 800. For example, at least one of the plurality of inserts 856a, 856b, 856c, 856d may be positioned in a portion of flow tube 800 that is driven to oscillate by driver 180, such as the portion of flow tube 800 between brace bars 140 and 140' in FIG. 1.

By providing inserts 856a, 856b, 856c, 856d in the active portions of flow tube 800, it may be possible to provide turbulent flow where the Coriolis forces are the strongest, and where the pick-off sensors 170L, 170R tend to be positioned. This may minimize the errors generated due to undermeasurement of fluids under laminar flow for Coriolis flow meter 100.

In embodiments, the first position 858 of at least one of the plurality of inserts 856a, 856b, 856c, 856d is within a bend of the conduit. For example, at least one of the plurality of inserts 856a, 856b, 856c, 856d may be positioned in a portion of bend 802a or 802b, which may be seen in FIGS. 8A and 8B, respectively.

By providing inserts 856a, 856b, 856c, 856d within a bend portion 802a, 802b of flow tube 800, it may be possible to produce turbulent flow where it may provide the greatest area of turbulent flow in a fluid under test. This may further help minimize the errors generated due to undermeasurement of fluids under laminar flow for Coriolis flow meter 100.

In embodiments, each respective insert of the plurality of inserts 856*a*, 856*b*, 856*c*, 856*d* may extend across at least 25 percent of a diameter of the conduit 852. By providing inserts 856*a*, 856*b*, 856*c*, 856*d* that do not connect to two separate portions of the interior surface 854, it may be possible to maximize turbulent flow without causing alignment problems that may result if an insert is connected at two separate portions to interior surface 854 during manufacturing flow tube 800.

As those of skill will readily understand, however, each respective insert of the plurality of inserts 856*a*, 856*b*, 856*c*, 856*d* may span any portion of the diameter of the conduit 852. In embodiments, for example, the plurality of inserts 856*a*, 856*b*, 856*c*, 856*d* may extend across at least 30, 50, 70, or 100 percent of a diameter of the conduit 852.

In further embodiments, however, one or more inserts of the plurality of inserts 856*a*, 856*b*, 856*c*, 856*d* may include a first end coupled to the first position and a second end that is coupled to at least a second position on the interior surface of the conduit. In examples, any insert of the plurality of inserts 856*a*, 856*b*, 856*c*, 856*d* may be positioned to pass through the central axis of flow tube 800. In further examples, however, any insert of the plurality of inserts 856*a*, 856*b*, 856*c*, 856*d* may be positioned across a cross-section of the flow tube without passing through the central axis of flow tube 800.

In embodiments, the plurality of inserts 856*a*, 856*b*, 856*c*, 856*d* may be shaped as rods. For example, plurality of inserts 856*a*, 856*b*, 856*c*, 856*d* may comprise long, thin members with circular cross sections.

In further embodiments, the plurality of inserts 856*a*, 856*b*, 856*c*, 856*d* may be shaped as fins. In examples, the fins may comprise substantially planar inserts with a longitudinal direction extending along the axis of the flow tube.

In further embodiments, other shapes or orientations of inserts 856*a*, 856*b*, 856*c*, 856*d* that provide turbulent flow in the fluid under test, and/or allow for low-cost manufacturing may be possible, as will be understood by those of skill.

In embodiments, a diameter of flow tube 800 conduit 852 may be at least 2 inches. This may provide for improved meter accuracy in larger meters, which are more likely to experience laminar flow causing undermeasurement of fluids under test.

Figure 9:
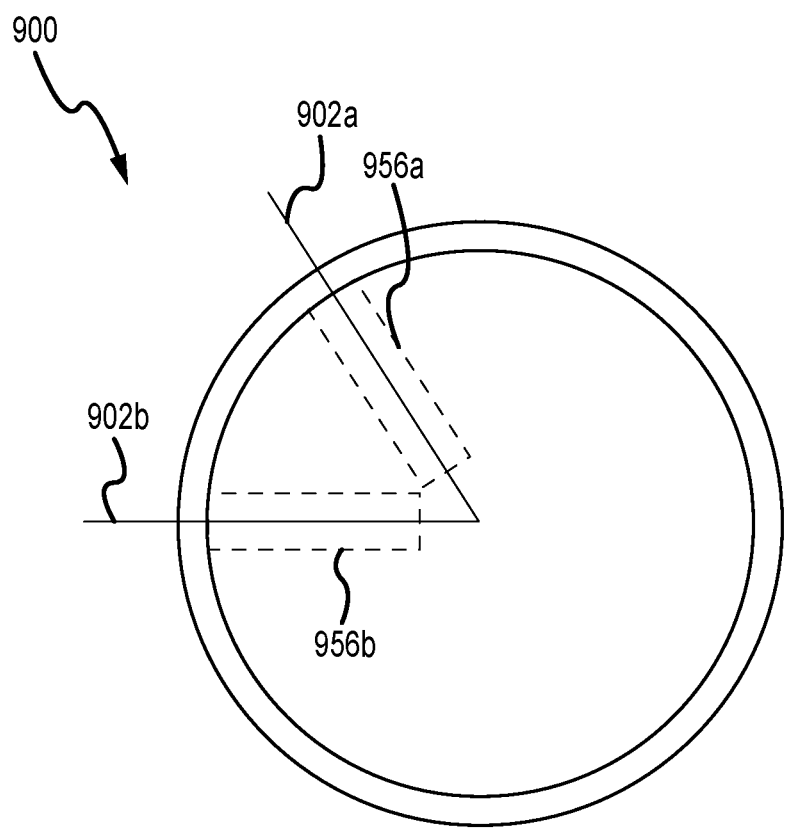
FIG. 9 depicts flow tube 900, in accordance with an embodiment.

In embodiments, the plurality of inserts 856*a*, 856*b*, 856*c*, 856*d* may include a first insert having a first longitudinal extent and a second insert having a second longitudinal extent, the first longitudinal extent being offset 45 degrees or more from the second longitudinal extent. For example, FIG. 9 depicts a cross-sectional view of flow tube 900, in accordance with an embodiment. In FIG. 9, it may be seen that first insert 956*a* has a first longitudinal extent 902*a* and second insert 956*b* has a second longitudinal extent 902*b*. In embodiments, first insert 956*a* and second insert 956*b* may be positioned along the same or different locations along the longitudinal length of flow tube 900. First longitudinal extent 902*a* is oriented to be offset 45 degrees or more from second longitudinal extent 902*b*.

By orienting one or more inserts of the plurality of inserts 956*a*, 956*b* in different directions, it may be possible to improve the ability for flow tube 900 to create turbulent flow of fluids under test.

Figure 10:
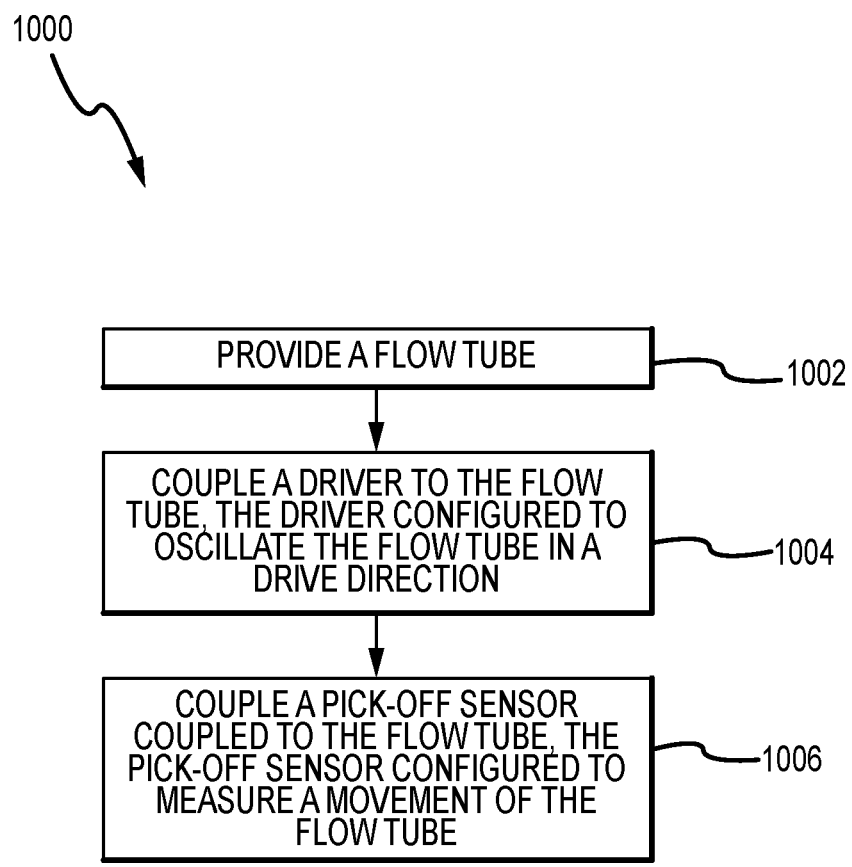
FIG. 10 depicts method 1000, in accordance with an embodiment.
Figure 11:
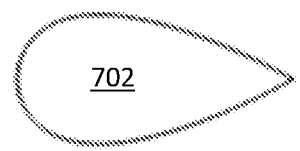
FIG. 11 illustrates a fin-shaped insert.

FIG. 10 depicts method 1000, in accordance with an embodiment. Method 1000 may be executed to assemble a Coriolis flow meter in accordance with an embodiment.

Method 1000 begins with step 1002. In step 1002, a flow tube is provided. For example, flow tube 800 comprising conduit 852 having an interior surface 854, and plurality of inserts 856*a*, 856*b*, 856*c*, 856*d*, each respective insert of the plurality of inserts 856*a*, 856*b*, 856*c*, 856*d* being coupled to at least a first position 858 on interior surface 854 of the conduit 852 may be provided, as described above.

In embodiments, flow tube 800 may be formed by drilling, machining, wire electrical discharge machining, one or more holes through conduit 852. Each respective insert of the plurality of inserts 856*a*, 856*b*, 856*c*, 856*d* may then be inserted into a respective hole of the plurality of holes, and welded, brazed, or otherwise coupled to the conduit 852, thereby sealing the flow tube 800 from fluid leaks.

In further embodiments, flow tube 800 may be fabricated via injection molding.

Method 1000 continues with step 1004. In step 1004 a driver is coupled to the flow tube, the driver configured to oscillate the flow tube in a drive direction. For example, driver 180 may be coupled to flow tube 800 to oscillate flow tube 800 in the drive direction, as described above, using any coupling technique known to those of skill.

Method 1000 continues with step 1006. In step 1006 a pick-off sensor is coupled to the flow tube, the pick-off sensor configured to measure a movement of the flow tube.

For example, pick-off sensor 170L, 170R may be coupled to flow tube 800 to measure the movement of flow tube 800 using any coupling technique known to those of skill.

Method 1000 may allow for the assembly of a Coriolis flow meter that lacks the undermeasurement problems found in flow meters with fluids under test that have Reynolds numbers Re below 100000, and therefore tend to exhibit laminar flow.

In embodiments of method 1000, the plurality of inserts may be shaped as rods, as described above.

In embodiments of method 1000, the plurality of inserts may be shaped as fins, as described above.

In embodiments of method 1000, the first position of at least one of the plurality of inserts may be positioned in an active portion of the conduit, as described above.

In embodiments of method 1000, the first position of at least one of the plurality of inserts may be positioned within a bend of the conduit, as described above.

In embodiments, each respective insert of the plurality of inserts may extend across at least 25 percent of a diameter of the conduit, as described above.

In embodiments, each respective insert of the plurality of inserts may include a first end coupled to the first position and a second end coupled to at least a second position on the interior surface of the conduit, as described above.

In embodiments, a diameter of the conduit may be at least 2 inches, as described above.

In embodiments, the plurality of inserts 956*a*, 956*b* may include a first insert 956*a* having a first longitudinal extent 902*a* and a second insert 956*b* having a second longitudinal extent 902*b*, the first longitudinal extent 902*a* being offset 45 degrees or more from the second longitudinal extent 902*b*.

Thus, although specific embodiments are described herein for illustrative purposes, various equivalent modifications are possible within the scope of the present description, as those skilled in the relevant art will recognize. Accordingly, the scope of the embodiments described above should be determined from the following claims.

What is claimed is:

1. A Coriolis flow meter (100) comprising one or more flow tubes (800, 900), further comprising:
   a driver (180) coupled to the one or more flow tubes (800, 900), the driver (180) configured to oscillate the one or more flow tubes (800, 900) in a drive direction;

a pick-off sensor (170L, 170R) coupled to the one or more flow tubes (800,900), configured to measure a movement of the one or more flow tubes (800,900); and each of the one or more flow tubes (800,900) comprising:
a conduit (852) having an interior surface (854); and
a plurality of solid rod-shaped inserts (856a, 856b, 856c, 856d, 956a, 956b), each being the same, and each respective insert of the plurality of solid rod-shaped inserts (856a, 856b, 856c, 856d, 956a, 956b) being coupled to at least a first position (858) on the interior surface (854) of the conduit (852), wherein the plurality of solid rod-shaped inserts are disposed parallel to the direction of a fluid flow in the flow tube;

wherein the plurality of inserts (856a, 856b, 856c, 856d, 956a, 956b) is configured to generate turbulent flow in the one or more flow tubes, and operable to minimize flow measurement errors generated due to an undermeasurement of fluids in the flow tube under laminar flow.

2. The Coriolis flow meter (100) as claimed in claim 1, wherein the plurality of solid rod-shaped inserts (856a, 856b, 856c, 856d, 956a, 956b) comprise an airfoil-shaped cross-sectional profile.

3. The Coriolis flow meter (100) as claimed in claim 1, wherein the first position (858) on the interior surface (854) of the conduit (852) is within a bend (802a, 802b) of the conduit (852).

4. The Coriolis flow meter (100) as claimed in claim 1, wherein each respective insert of the plurality of solid rod-shaped inserts (856a, 856b, 856c, 856d, 956a, 956b) extends across at least 25 percent of a diameter of the conduit (852).

5. The Coriolis flow meter (100) as claimed in claim 1, wherein each respective insert of the plurality of solid rod-shaped inserts (856a, 856b, 856c, 856d, 956a, 956b) includes a first end coupled to the first position (858) and a second end that is coupled to at least a second position on the interior surface (854) of the conduit (852).

6. The Coriolis flow meter (100) as claimed in claim 1, wherein a diameter of the conduit (852) is at least 2 inches.

7. The Coriolis flow meter (100) as claimed in claim 1, wherein the plurality of solid rod-shaped inserts (956a, 956b) includes a first insert (956a) having a first longitudinal extent (902a) and a second insert (956b) having a second longitudinal extent (902b), the first longitudinal extent (902a) being offset 45 degrees or more from the second longitudinal extent (902b).

8. A method of assembling a Coriolis flow meter (100) comprising one or more flow tubes (800, 900), the method comprising:

coupling a driver (180) to the one or more flow tubes (800,900), the driver (180) configured to oscillate the one or more flow tubes (800,900) in a drive direction; and coupling a pick-off sensor (170L, 170R) coupled to the one or more flow tubes (800,900), the pick-off sensor (170L, 170R) configured to measure a movement of the flow tube (800,900), wherein each of the one or more flow tubes (800,900) comprise a conduit (852) having an interior surface (854), and a plurality of solid rod-shaped inserts (856a, 856b, 856c, 856d, 956a, 956b), each being the same, and each respective insert of the plurality of solid rod-shaped inserts (856a, 856b, 856c, 856d, 956a, 956b) being coupled to at least a first position (858) on the interior surface (854) of the conduit (852), wherein the plurality of solid rod-shaped inserts are disposed parallel to the direction of a fluid flow in the flow tube;

wherein the plurality of inserts (856a, 856b, 856c, 856d, 956a, 956b) is configured to generate turbulent flow in the one or more flow tubes, and operable to minimize Coriolis flow measurement errors generated due to an undermeasurement of fluids in the flow tube under laminar flow.

9. A method as claimed in claim 8, wherein the plurality of solid rod-shaped inserts (856a, 856b, 856c, 856d, 956a, 956b) comprise an airfoil-shaped cross-sectional profile.

10. A method as claimed in claim 8, wherein the first position (858) on the interior surface (854) of the conduit (852) is within a bend (802a, 802b) of the conduit (852).

11. A method as claimed in claim 8, wherein each respective insert of the plurality of solid rod-shaped inserts (856a, 856b, 856c, 856d, 956a, 956b) extends across at least 25 percent of a diameter of the conduit (852).

12. A method as claimed in claim 8, wherein each respective insert of the plurality of solid rod-shaped inserts (856a, 856b, 856c, 856d, 956a, 956b) includes a first end coupled to the first position (858) and a second end that is coupled to at least a second position on the interior surface (854) of the conduit (852).

13. A method as claimed in claim 8, wherein a diameter of the conduit (852) is at least 2 inches.

14. The method as claimed in claim 8, wherein the plurality of solid rod-shaped inserts (956a, 956b) includes a first insert (956a) having a first longitudinal extent (902a) and a second insert (956b) having a second longitudinal extent (902b), the first longitudinal extent (902a) being offset 45 degrees or more from the second longitudinal extent (902b).

* * * * *